United States Patent
Suzuki

(10) Patent No.: US 12,048,984 B2
(45) Date of Patent: Jul. 30, 2024

(54) METHOD FOR PRODUCING TRACK RING MEMBER, METHOD FOR PRODUCING ROLLING BEARING, METHOD FOR PRODUCING HUB UNIT BEARING, AND METHOD FOR PRODUCING VEHICLE

(71) Applicant: NSK Ltd., Tokyo (JP)

(72) Inventor: Hidekazu Suzuki, Fujisawa (JP)

(73) Assignee: NSK LTD., Tokyo (JP)

( * ) Notice: Subject to any disclaimer, the term of this patent is extended or adjusted under 35 U.S.C. 154(b) by 269 days.

(21) Appl. No.: 17/425,449

(22) PCT Filed: Dec. 2, 2019

(86) PCT No.: PCT/JP2019/046946
§ 371 (c)(1),
(2) Date: Jul. 23, 2021

(87) PCT Pub. No.: WO2020/158161
PCT Pub. Date: Aug. 6, 2020

(65) Prior Publication Data
US 2022/0097195 A1    Mar. 31, 2022

(30) Foreign Application Priority Data
Jan. 31, 2019 (JP) .................... 2019-015850

(51) Int. Cl.
*B24B 5/18* (2006.01)
*B24B 19/06* (2006.01)
(Continued)

(52) U.S. Cl.
CPC ............... *B24B 5/18* (2013.01); *B24B 19/06* (2013.01); *B60B 27/0005* (2013.01);
(Continued)

(58) Field of Classification Search
CPC ........ B60B 2310/228; B60B 2310/234; B24B 19/06; B24B 5/18; F16C 33/64
See application file for complete search history.

(56) References Cited

U.S. PATENT DOCUMENTS

| 6,896,416 B2 * | 5/2005 | Matsuzaki | ............. F16C 33/64 384/516 |
|---|---|---|---|
| 2014/0185975 A1 | 7/2014 | Furukoshi | |
| 2019/0105946 A1 | 4/2019 | Takanashi | |

FOREIGN PATENT DOCUMENTS

| DE | 3930059 C1 | 2/1991 |
|---|---|---|
| JP | 53-79965 U | 7/1978 |

(Continued)

OTHER PUBLICATIONS

Written Opinion of the International Searching Authority for PCT/JP2019/046946 (Year: 2020).*

(Continued)

*Primary Examiner* — Christopher J. Besler
(74) *Attorney, Agent, or Firm* — Sughrue Mion, PLLC

(57) ABSTRACT

A centerless grinding processing in which a sliding contact surface (10) is subjected to grinding by pressing a grindstone against the sliding contact surface (10) of an inner ring (3) while rotating the inner ring (3) relative to the grindstone in a prescribed direction, and then, in the centerless grinding process, a finishing step in which grinding lines in a direction intersecting grinding lines formed on the sliding contact surface (10) are formed on the sliding contact surface (10) and/or processing for improving the surface roughness of the sliding contact surface (10) is performed is performed.

11 Claims, 9 Drawing Sheets

(51) Int. Cl.
    *B60B 27/00*     (2006.01)
    *F16C 19/06*     (2006.01)
    *F16C 33/64*     (2006.01)

(52) U.S. Cl.
    CPC ...... *B60B 27/0073* (2013.01); *B60B 27/0078* (2013.01); *F16C 19/06* (2013.01); *F16C 33/64* (2013.01)

(56) References Cited

FOREIGN PATENT DOCUMENTS

| | | |
|---|---|---|
| JP | 2001-138186 A | 5/2001 |
| JP | 2005-299730 A | 10/2005 |
| JP | 2007-187217 A | 7/2007 |
| JP | 2007-239919 A | 9/2007 |
| JP | 2011-179536 A | 9/2011 |
| JP | 2014-126178 A | 7/2014 |
| JP | 2014-126180 A | 7/2014 |
| JP | 2017-190865 A | 10/2017 |
| JP | 2018-66405 A | 4/2018 |
| WO | 2016/098886 A1 | 6/2016 |

OTHER PUBLICATIONS

Machine Translation of JP 2005-299730 A (Year: 2005).*
Notice of Reasons for Rejection of Japanese Application No. 2020-561085 dated Feb. 9, 2021.
International Search Report of PCT/JP2019/046946 dated Feb. 10, 2020 [PCT/ISA/210].
Extended European Search Report issued Feb. 2, 2022 in European Application No. 19913321.6.
Chinese Office Action dated Oct. 12, 2023 in Application No. 201980090158.3.

* cited by examiner

200

METHOD FOR PRODUCING TRACK RING MEMBER, METHOD FOR PRODUCING ROLLING BEARING, METHOD FOR PRODUCING HUB UNIT BEARING, AND METHOD FOR PRODUCING VEHICLE

CROSS REFERENCE TO RELATED APPLICATIONS

This application is a National Stage of International Application No. PCT/JP2019/046946, filed Dec. 2, 2019, claiming priority to Japanese Patent Application No. 2019-015850, filed Jan. 31, 2019, the contents of all of which are incorporated herein by reference in their entirety.

TECHNICAL FIELD

The present invention relates to a method for producing an inner ring and an outer ring constituting a rolling bearing and a track ring member such as a hub constituting a hub unit bearing.

BACKGROUND ART

Rolling bearings such as ball bearings, roller bearings, and tapered roller bearings are incorporated in rotation support portions of various mechanical devices. Rolling bearings include an outer ring having an outer ring track on an inner circumferential surface, an inner ring having an inner ring track on an outer circumferential surface, and a plurality of rolling elements rotatably disposed between the outer ring track and the inner ring track. Furthermore, when the rolling bearing includes a sealing device, the grease sealed in an internal space having the rolling elements installed therein is prevented from leaking to the outside and foreign matter such as rainwater, mud, and dust is prevented from entering the internal space. The sealing device has at least one seal lip having a distal end portion in contact with a sliding contact surface formed on the inner ring in a slidable manner over the entire circumference.

In order to keep the sliding torque of a distal end portion of the seal lip with respect to the sliding contact surface low during relative rotation between the outer ring and the inner ring, a portion of the inner ring including at least the sliding contact surface is subjected to grinding using a grindstone. As a method for grinding a portion of the inner ring including at least the sliding contact surface, for example, the centerless grinding method described in Japanese Unexamined Patent Application, First Publication No. 2001-138186 is known. That is to say, in a state in which the inner ring is supported from below by means of a work rest, when a rotary grindstone is pressed against an outer circumferential surface of the inner ring from a side substantially opposite to that of the adjustment wheel in a radial direction while the inner ring rotates by pressing a rotating adjustment wheel against an outer circumferential surface of the inner ring, the outer circumferential surface of the inner ring is subjected to grinding.

CITATION LIST

Patent Literature

[Patent Literature 1]
 Japanese Patent Application, Publication No. 2001-138186

SUMMARY OF INVENTION

Technical Problem

When the outer circumferential surface of the inner ring is subjected to grinding using a grindstone, as the grindstone rotates relative to the inner ring, abrasive grains in the grindstone come into contact with the outer circumferential surface of the inner ring. As the grindstone rotates relative to the inner ring, the abrasive grains move in a circumferential direction while being pressed against the outer circumferential surface of the inner ring. Thus, a metal present on the outer circumferential surface of the inner ring is removed using the abrasive grains. After that, as the grindstone rotates relative to the inner ring, the abrasive grains are separated from the outer circumferential surface of the inner ring. Therefore, when the inner ring is subjected to grinding by pressing a rotary grindstone having a certain degree of hardness against the outer circumferential surface of the inner ring while the inner ring is rotating relative to the grindstone in a prescribed direction, deformation such as ridges and burrs occurs on both sides of a portion through which the abrasive grains have passed. A tendency (directivity) exists in such deformation in a circumferential direction. For this reason, assuming that a portion in which deformation exists is a sliding contact surface with which the distal end portion of the seal lip is in contact in a slidable manner, a difference in sliding torque of the distal end portion of the seal lip with respect to the sliding contact surface between a first relative rotation direction and a second relative rotation direction of the outer ring and the inner ring, that is, a difference in rotational torque (a difference in rotational torque between forward rotation and reverse rotation) of the inner ring with respect to the outer ring is likely to be a significant difference. To be specific, assuming that the outer ring is fixed, the sliding torque of the distal end portion of the seal lip with respect to the sliding contact surface is likely to be different (a difference occurs in sliding torque) between a case in which the inner ring is rotated in a prescribed direction (first relative rotation) and a case in which the inner ring is rotated in a direction opposite to the prescribed direction (second relative rotation). One reason for this is thought to be that the sliding torque of the distal end portion of the seal lip with respect to the sliding contact surface is different depending on whether the sliding direction of the distal end portion of the seal lip with respect to the sliding contact surface is the same as the moving direction of the grindstone with respect to the inner ring when the inner ring is subjected to grinding by means of the grindstone.

According to the present invention, for example, an object of the present invention is to realize a method for producing a track ring member having excellent rotational characteristics such as being able to minimize a difference in sliding torque of a distal end portion of a seal lip with respect to a sliding contact surface due to a relative rotation direction of a pair of track ring members.

Solution to Problem

An aspect of a method for producing a track ring member of the present invention is to produce a track ring member having a sliding contact surface with which a distal end portion of a seal lip is in contact in a slidable manner over the entire circumference, including: performing a centerless grinding process in which the sliding contact surface is subjected to grinding by pressing a grindstone against the sliding contact surface while rotating the track ring member relative to the grindstone in a prescribed direction, and then performing a finishing step in which a large number of grinding lines in irregular directions are formed on the sliding contact surface and/or processing for ameliorating a surface roughness of the sliding contact surface is performed.

The finishing step can be performed by subjecting the sliding contact surface to polishing processing using an abrasive grain-containing brush, a non-woven fabric abrasive, or a polishing tape (a wrapping film), polishing processing using an elastic grindstone, or super-finishing processing.

An aspect of a method for producing a rolling bearing of the present invention has, as a target, a rolling bearing which includes: a first track ring member; a second track ring member having a surface having a sliding contact surface over the entire circumference and disposed coaxially with the first track ring member; a plurality of rolling elements rotatably disposed between the first track ring member and the second track ring member; and a sealing device having at least one seal lip having a distal end portion in contact with the sliding contact surface in a slidable manner.

In an aspect of the method for producing a rolling bearing of the present invention, the second track ring member is produced using the method for producing a track ring member of the present invention.

One of the first track ring member and the second track ring member can be set as an outer ring, and the other of the first track ring member and the second track ring member can be set as an inner ring coaxially disposed with the outer ring on an inner diameter side of the outer ring. It is preferable that the first track ring member be set as the outer ring and the second track ring member be set as the inner ring. Here, the first track ring member may be set as the inner ring and the second track ring member may be set as the outer ring.

An aspect of a method for producing a hub unit bearing of the present invention has, as a target, a hub unit bearing which includes: an outer diameter side track ring member having a double-row outer ring track on an inner circumferential surface; an inner diameter side track ring member having a surface having a sliding contact surface over the entire circumference and having a double-row inner ring track on an outer circumferential surface; a plurality of rolling elements rotatably disposed between the double-row outer ring track and the double-row inner ring track; and a sealing device having at least one seal lip having a distal end portion in contact with the sliding contact surface in a slidable manner, in which one of the outer diameter side track ring member and the inner diameter side track ring member is a fixed side track ring member supported and fixed to a suspension device, and the other of the outer diameter side track ring member and the inner diameter side track ring member is a rotation side track ring member which rotates together with a wheel and a braking rotating body.

In an aspect of the method for producing a hub unit bearing of the present invention, the inner diameter side track ring member is produced using the method for producing a track ring member of the present invention.

An aspect of a method for producing a vehicle of the present invention has, as a target, a vehicle including a hub unit bearing and the hub unit bearing is produced using the method for producing a hub unit bearing of the present invention.

An aspect of the present invention is a method for producing a rolling bearing using centerless grinding, in which the rolling bearing has an inner ring, an outer ring, a plurality of rolling elements, a seal lip, and a sliding contact surface which is provided on the inner ring or the outer ring and with which a distal end of the seal lip is in contact in a slidable manner, the method including: subjecting the sliding contact surface to centerless grinding while pressing a grindstone against a portion of the inner ring or the outer ring including the sliding contact surface; and subjecting the sliding contact surface to a process for eliminating directivity of surface roughness generated on the sliding contact surface using centerless grinding.

An aspect of the present invention is a method for producing a hub unit bearing using centerless grinding in which the hub unit bearing has an outer ring, a hub, a plurality of rolling elements, a seal lip, and a sliding contact surface which is provided on the outer ring or the hub and with which a distal end of the seal lip is in contact in a slidable manner, the method including: subjecting the sliding contact surface to centerless grinding while pressing a grindstone against a portion of the outer ring or the hub including the sliding contact surface; and subjecting the sliding contact surface to a process for eliminating directivity of surface roughness generated on the sliding contact surface using centerless grinding.

Advantageous Effects of Invention

According to an aspect of the present invention, for example, it is possible to realize a method for producing a track ring member having excellent rotational characteristics such as being able to minimize a difference in sliding torque of a distal end portion of a seal lip with respect to a sliding contact surface due to a relative rotation direction of a pair of track ring members.

DESCRIPTION OF EMBODIMENTS

First Example of Embodiment

Figure 1:
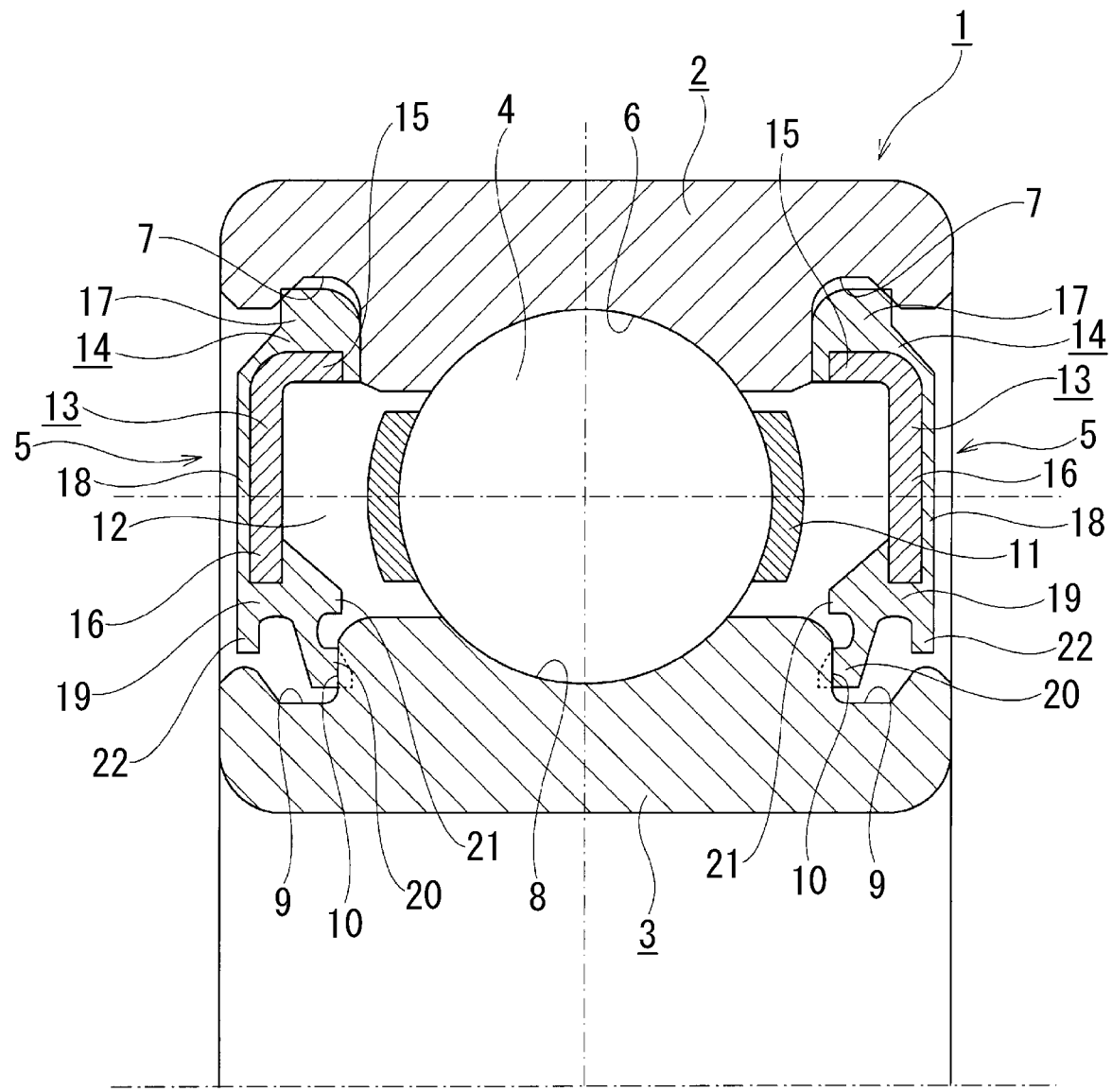
FIG. 1 is a cross-sectional view showing a rolling bearing which is a target of a first example of an embodiment of the present invention.

A first example of an embodiment of the present invention will be described with reference to FIGS. 1 to 4. FIG. 1 shows a rolling bearing 1 which is a target of this example. The rolling bearing 1 includes an outer ring 2 which is a first track ring member, an inner ring 3 which is a second track ring member, a plurality of rolling elements 4, and a pair of sealing devices (seal rings) 5.

The outer ring 2 is made of a hard iron-based alloy such as bearing steel or carbon-immersed steel, has an outer ring track 6 having a circular arc-shaped cross section over the entire circumference on an inner circumferential surface of a central portion in an axial direction, and has locking concave grooves 7 recessed outward in a radial direction in inner circumferential surfaces on both side portions in the axial direction over the entire circumference.

The inner ring 3 is made of a hard iron-based alloy such as bearing steel or carbon-immersed steel and is disposed coaxially with the outer ring 2 on an inner diameter side of the outer ring 2. The inner ring 3 has an inner ring track 8 having a circular arc-shaped cross section over the entire circumference on an outer circumferential surface of a central portion in the axial direction and has seal grooves 9 recessed inward in the radial direction in outer circumferential surfaces on both side portions in the axial direction over the entire circumference. Furthermore, the inner ring 3 has a circular ring-shaped sliding contact surface 10 on side surfaces of inner surfaces of the seal grooves 9 directed in directions opposite to each other (outward in the axial direction) over the entire circumference. In this example, the sliding contact surface 10 has a large number of grinding lines formed in irregular directions and/or an arithmetic average roughness Ra of the sliding contact surface 10 is 0.1 μm or less.

With regard to the rolling bearing 1, an inside thereof in the axial direction is referred to as a central side of the rolling bearing 1 in a width direction and an outside thereof in the axial direction is referred to as an outside (both sides) of the rolling bearing 1 in the width direction.

Each of the rolling elements 4 is made of an iron-based alloy such as bearing steel or ceramics and is rotatably disposed between the outer ring track 6 and the inner ring track 8 in the state of being held by means of a retainer 11. In this example, balls are used as the rolling elements 4.

Each of the sealing devices 5 closes opening portions on both sides of an internal space 12 having the rolling elements 4 disposed therein in the axial direction to prevent the grease sealed in the internal space 12 from leaking to the outside and to prevent foreign matters such as rainwater, mud, and dust from entering the internal space 12. Each of the sealing devices 5 includes an annular core metal 13 and an elastic material 14 made of an elastomer such as rubber reinforced using the core metal 13. Each of the sealing devices 5 can be produced by disposing the core metal 13 in a cavity of a mold and then mould-forming a material constituting the elastic material 14 into the core metal 13. As the material constituting the elastic material 14, for example, nitrile rubber, acrylic rubber, silicon rubber, fluororubber, ethylene propylene-based rubber, hydrogenated nitrile rubber, and the like can be used.

The core metal 13 has a substantially L-shaped cross-sectional shape by bending and forming a metal sheet such as a mild steel sheet and is formed in an annular shape as a whole. That is to say, the core metal 13 includes a cylindrical portion 15 and an annular portion 16 bent at a right angle from an axially outer end portion of the cylindrical portion 15 toward an inner side in the radial direction.

The elastic material 14 includes an elastic locking portion 17 existing at a radially outer end portion, a thin-walled circular ring covering portion 18 which covers an axial outer surface of the annular portion 16 over the entire circumference, and a seal portion 19 existing at a radially inner end portion.

The elastic locking portion 17 has a width dimension slightly larger than a width dimension (an axial dimension) of each of the locking concave grooves 7 in a free state before the elastic locking portion 17 is locked to the locking concave groove 7 of the outer ring 2 and covers an outer circumferential surface and a distal end surface (an axially inner end surface) of the cylindrical portion 15 of the core metal 13.

The seal portion 19 includes a seal lip 20, a grease lip 21, and a dust lip 22.

The seal lip 20 is formed to further protrude radially inward and axially inward than a radially inner end portion of the annular portion 16 of the core metal 13 and has a distal end portion in contact with the sliding contact surface 10 of each of the seal grooves 9 in a slidable manner over the entire circumference.

The grease lip 21 has a substantially triangular cross-sectional shape and is formed to further protrude inward in the axial direction from a portion of the seal portion 19 located at an outer side in the radial direction than the seal lip 20. When a distal end portion of the grease lip 21 is brought close to and to face a connection portion of the outer circumferential surface of the inner ring 3 between the inner ring track 8 and the seal groove 9, the grease lip 21 constitutes a labyrinth seal between the portion and a distal end portion of the grease lip 21.

The dust lip 22 has a substantially rectangular cross-sectional shape and is formed to extend inward in the radial direction from the radially inner end portion of the circular ring covering portion 18. When a distal end portion of the dust lip 22 is brought close to and to face a portion of the inner ring 3 existing at a further outer side in the axial direction than the seal groove 9, the dust lip 22 constitutes a labyrinth seal between the portion and the distal end portion of the dust lip 22.

Each of the sealing devices 5 supports the elastic locking portion 17 with respect to the outer ring 2 by disposing (locking) the elastic locking portion 17 inside the locking concave groove 7 while elastically compressing the elastic locking portion 17 in the axial direction and the radial direction and brings the distal end portion of the seal lip 20 into contact with the sliding contact surface 10 of the seal groove 9 in a slidable manner over the entire circumference with a tightening allowance.

When the inner ring 3 constituting the rolling bearing 1 is produced, first, an exterior form of the inner ring 3 is formed by subjecting a material made of a metal to plastic processing such as forging processing or cutting processing.

Figure 2:
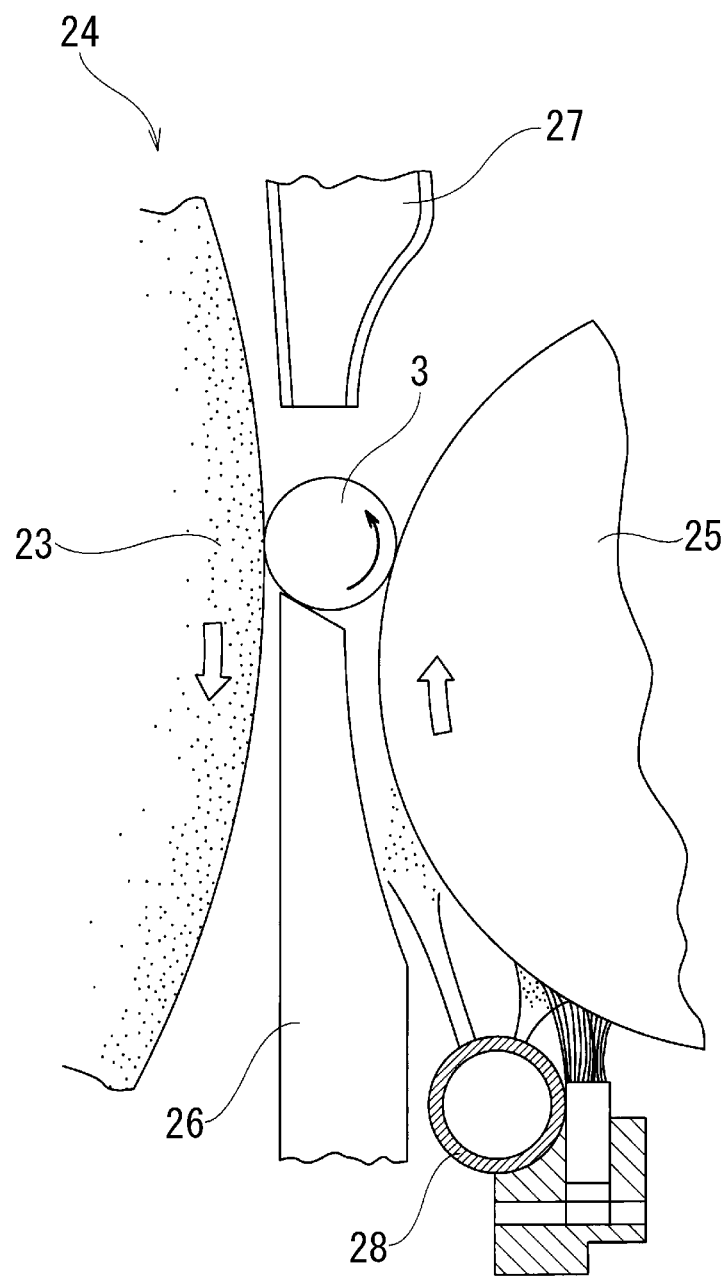
FIG. 2 is a side view showing a state in which a centerless grinding process is performed for the first example of the embodiment of the present invention.

The centerless grinding process which will be described later can be performed, for example, using a grinding machine 24 as shown in FIG. 2. The grinding machine 24 includes a grindstone 23, an adjustment wheel 25, a work rest 26, and a grinding fluid nozzle 27. In the centerless grinding process, the outer circumferential surface of the inner ring 3 is subjected to grinding processing by pressing the grindstone 23 against a portion of the outer circumferential surface of the inner ring 3 including the sliding contact surface 10 while rotating the inner ring 3 in one direction.

The grindstone 23 is a rotary grindstone which has a disk shape, has a generatrix shape along a generatrix shape of the outer circumferential surface of the inner ring 3, and rotates about a central axis (not shown). Examples of the grindstone 23 include grindstones formed by bonding A (alumina)-based abrasive grains with a glass-based bond, having a bonding particle size of #60 to #400, a degree of bonding of G to O, a degree of concentration of 4 to 12, and a porosity of 20% to 50%.

The adjustment wheel 25 can be rotationally driven about the central axis inclined at a prescribed angle with respect to a central axis of the grindstone 23. The illustrated grinding machine 24 further includes a cleaning device 28 for removing foreign matters such as grinding debris adhering to an outer circumferential surface of the adjustment wheel 25 during grinding processing.

The work rest 26 is disposed below a portion between the grindstone 23 and the adjustment wheel 25 and supports the inner ring 3 from below.

The grinding fluid nozzle 27 is disposed above a portion between the grindstone 23 and the adjustment wheel 25 so that a grinding fluid discharge port is directed downward.

When the centerless grinding process is performed using the grinding machine 24, first, the inner ring 3 which is a work piece is placed between an upper surface of the work rest 26 and the outer circumferential surface of the adjustment wheel 25. Subsequently, a grinding fluid is discharged toward the outer circumferential surface of the inner ring 3 through the grinding fluid nozzle 27. Moreover, when the grindstone 23 rotating about the central axis of the grindstone 23 itself is pressed against the portion of the outer circumferential surface of the inner ring 3 including the sliding contact surface 10 while rotating the inner ring 3 in one direction (counterclockwise in the illustrated example) by rotatably driving the adjustment wheel 25, the portion is subjected to grinding processing. In this case, when a circumferential speed of the inner ring 3 and a circumferential speed of the grindstone 23 are made different from each other, the inner ring 3 is rotated relative to the grindstone 23 in a prescribed direction (one direction).

In this way, in the centerless grinding process, the outer circumferential surface of the inner ring 3 is subjected to grinding processing by pressing a hard grindstone 23 against the outer circumferential surface of the inner ring 3 while rotating the inner ring 3 relative to the grindstone 23 in a prescribed direction. For this reason, deformation such as ridges and burrs is likely to occur on both sides of a portion of the sliding contact surface 10 of the inner ring 3 obtained using centerless grinding process through which abrasive grains of the grindstone 23 has passed.

In a subsequent finishing step, the sliding contact surface is subjected to a process for eliminating the directivity of the surface roughness generated on the sliding contact surface 10 using centerless grinding. For example, in the finishing step, a large number of grinding lines in irregular directions are formed on the sliding contact surface 10 and/or process for improving the surface roughness of the sliding contact surface 10 is performed on the sliding contact surface 10. The directionality of the surface roughness is based on a relative moving direction of the sliding contact surface 10 with respect to the grindstone 23 in the centerless grinding. When the surface roughness of the sliding contact surface 10 is improved, specifically, an arithmetic average roughness Ra of the sliding contact surface 10 is set to 0.1 μm or less. When a large number of grinding lines in irregular directions are formed on the sliding contact surface 10, it is also possible to improve the surface roughness of the sliding contact surface 10.

Figure 3:
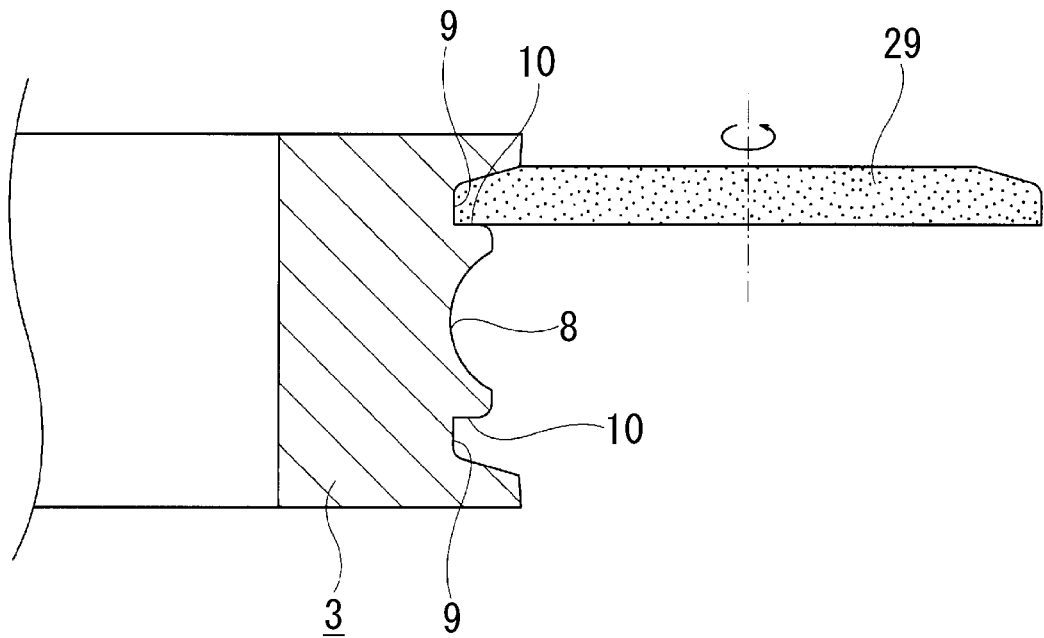
FIG. 3 is a cross-sectional view showing a state in which a finishing step is performed for the first example of the embodiment of the present invention.

The finishing step can be performed, for example, as shown in FIG. 3, using an elastic grindstone 29. The elastic grindstone 29 has a disk shape and has a generatrix shape along the generatrix shape of the seal groove 9. Furthermore, the elastic grindstone 29 has more pores and is softer (has appropriate elasticity) than the grindstone 23 used in the centerless grinding process. Specific examples of the elastic grindstone 29 include elastic grindstones formed by bonding A (alumina)-based abrasive grains with a resin-based bond, having a bonding particle size of #600 to #1200, a degree of bonding of F to T, a degree of concentration of 6 to 14, and a porosity of 40% to 80%, and softer than the grindstone 23 used in the centerless grinding process.

When the finishing step is performed using the elastic grindstone 29, the inner ring 3 is rotated about the central axis of the inner ring 3. Moreover, when a surface of a radially outer portion of the elastic grindstone 29 rotated about a central axis of the elastic grindstone 29 itself in the radial direction is pressed against each of the seal grooves 9 of the inner ring 3 and an inner surface of each of the seal grooves 9 including the sliding contact surface 10 is subjected to grinding processing, the surface roughness of the sliding contact surface 10 is improved. That is to say, the unevenness due to the ridges and the burrs formed in the centerless grinding process is reduced.

Figure 4:
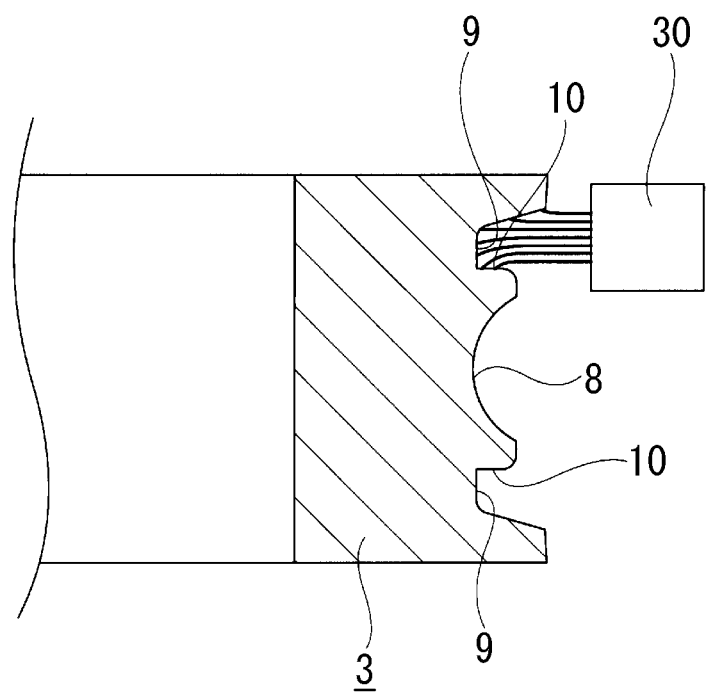
FIG. 4 is a cross-sectional view showing another example of the state in which the finishing step is performed for the first example of the embodiment of the present invention.

Alternatively, the finishing step can be performed using an abrasive grain-containing brush 30 as shown in FIG. 4, examples of the abrasive grain-containing brush 30 include abrasive grain-containing brushes made of a wire material having appropriate elasticity obtained by mixing nylon fibers such as nylon 6 with A (alumina)-based or GC (green silicon carbide)-based abrasive grains having a particle size of #80 to #600.

When the finishing step is performed using the abrasive grain-containing brush 30, the inner ring 3 is rotated about the central axis of the inner ring 3 while the abrasive grain-containing brush 30 is pressed against each of the seal grooves 9 of the inner ring 3. Thus, a large number of grinding lines in irregular directions are formed on the sliding contact surface 10 by subjecting the inner surface of each of the seal grooves 9 including the sliding contact surface 10 to polishing processing.

The finishing step is not limited to the method in which the elastic grindstone 29 or the abrasive grain-containing brush 30 is utilized, the finishing step is not particularly limited as long as a large number of grinding lines in irregular directions are formed on the sliding contact surface 10, and/or the finishing step can improve the surface roughness of the sliding contact surface 10. To be specific, for example, when the sliding contact surface 10 is polished by means of a non-woven fabric abrasive obtained by adhering A (alumina)-based or GC (green silicon carbide)-based abrasive grains having a particle size of #80 to #600 to a nylon non-woven fabric, it is possible to form a large number of grinding lines in irregular directions on the sliding contact surface 10. Alternatively, the sliding contact surface 10 is polished by means of a polishing tape (a wrapping film) having a surface coated with abrasive grains or the sliding contact surface 10 is subjected to a super-finishing processing in which a reciprocating grindstone is pressed, the surface roughness of the sliding contact surface 10 may be improved.

Even when the finishing step is performed by means of any method, the pair of seal grooves 9 can be processed at the same time or the pair of seal grooves 9 can be processed separately (in order).

Also, before, after, or at the same time as the finishing step, the inner ring 3 is completed by subjecting the inner ring track 8 to a super-finishing processing for improving the surface roughness of the inner ring track 8 or, if necessary, performing a heat treatment such as quenching at an appropriate timing. Moreover, the rolling bearing 1 is obtained by combining the inner ring 3 with the outer ring 2, the rolling elements 4, the pair of sealing devices 5, and the retainer 11. For example, conventionally known methods can be applied to the method for producing the outer ring 2, the rolling elements 4, the pair of sealing devices 5, and the retainer 11, and the method for assembling the rolling bearing 1.

Since the finishing step is performed after the centerless grinding process is performed in this example, a large number of grinding lines in irregular directions can be formed on the sliding contact surface 10 and/or the surface roughness of the sliding contact surface 10 can be improved. Therefore, according to this example, a difference in sliding torque of the distal end portion of the seal lip 20 with respect to the sliding contact surface 10 between the relative rotation of the inner ring 3 with respect to the outer ring 2 in a first direction and the relative rotation thereof in a second direction opposite to the first direction can be kept small as compared with a structure as it is subjected to the centerless grinding processing.

That is to say, when a large number of grinding lines in irregular directions are formed on the sliding contact surface 10 in the finishing step, an uneven shape of the sliding contact surface 10 becomes complicated or the distal end portion of the seal lip 20 does not easily enter a concave portion. The directivity of the surface roughness generated on the sliding contact surface 10 using centerless grinding is eliminated. As a result, a difference in sliding torque of the distal end portion of the seal lip 20 with respect to the sliding contact surface 10 due the relative rotation direction of the inner ring 3 with respect to the outer ring 2 can be reduced.

On the other hand, when the surface roughness of the sliding contact surface 10 is improved in the finishing step, that is, when the unevenness of the sliding contact surface 10 is reduced, the relative rotation of the inner ring 3 with respect to the outer ring 2 is less affected by deformation due to ridges and burrs formed in the centerless grinding process on the distal end portion of the seal lip 20. The directivity of the surface roughness generated on the sliding contact surface 10 using centerless grinding is eliminated. As a result, a difference in sliding torque of the distal end portion of the seal lip 20 with respect to the sliding contact surface 10 due to the relative rotation direction of the inner ring 3 with respect to the outer ring 2 can be reduced. The rolling bearing in which the directivity of the surface roughness generated on the sliding contact surface 10 is eliminated has high rotational characteristics and is preferably applied to rotating components used under both forward and reverse rotation conditions.

Although the method for producing a rolling bearing in this example has, as a target, a rolling bearing (ball bearing) 1 in which balls are used as the rolling elements 4, the method for producing a rolling bearing of the present invention can also have, as a target, a needle bearing, a cylindrical roller bearing, and a tapered roller bearing. Furthermore, the present invention is not limited to a single-row rolling bearing, can also have, as a target, a multi-row rolling bearing including multiple rows, and can also have, as a target, a structure in which the distal end portion of the seal lip constituting the sealing device is in contact with the sliding contact surface included in the outer ring in a slidable manner. Furthermore, the present invention is not limited to a radial rolling bearing and can also have, as a target, a thrust rolling bearing as long as the thrust rolling bearing includes a sealing device.

Second Example of Embodiment

Figure 5:
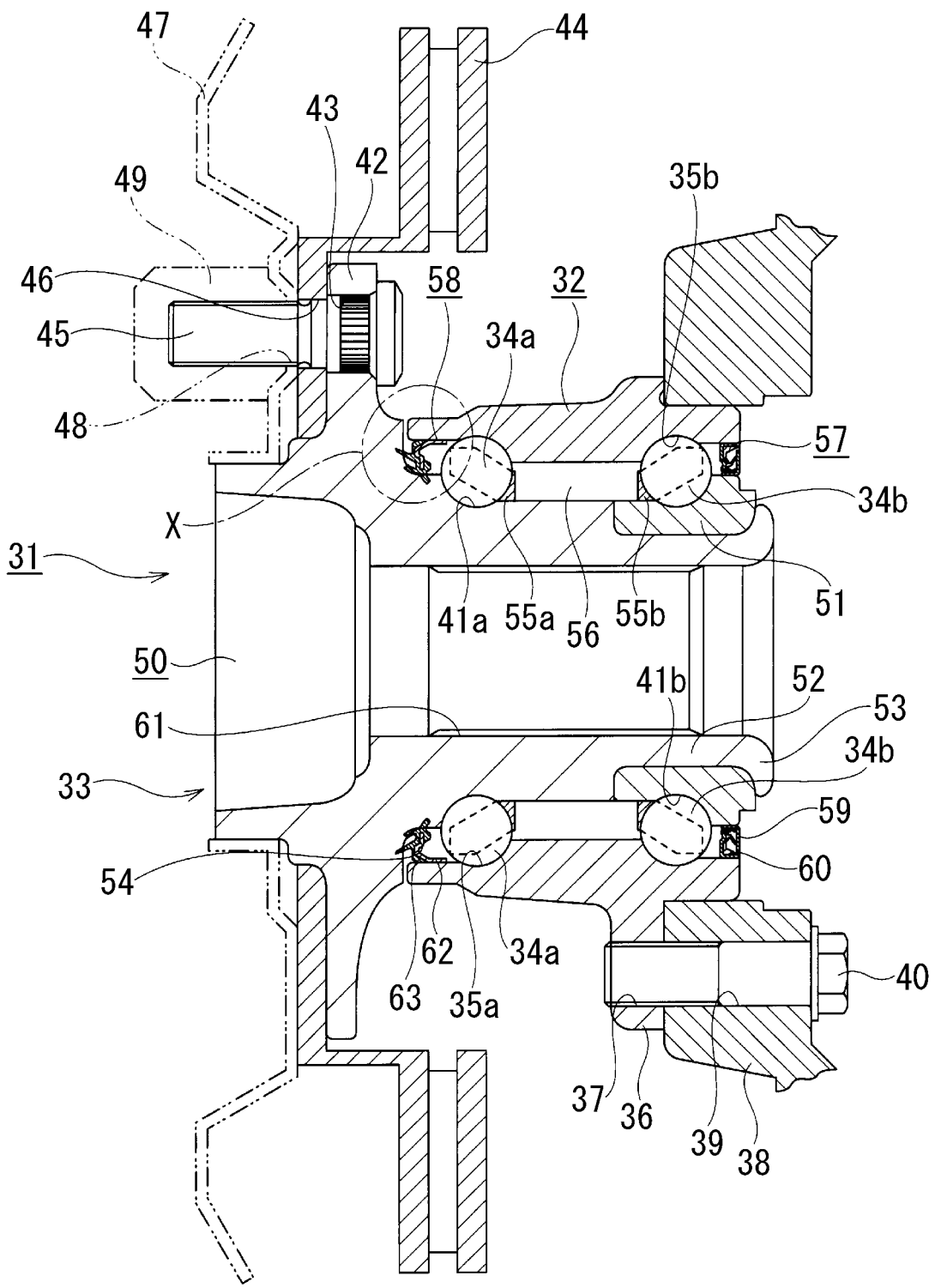
FIG. 5 is a cross-sectional view showing a hub unit bearing which is a target of a second example of the embodiment of the present invention.

A second example of the embodiment of the present invention will be described with reference to FIGS. 5 to 9. This example has, as a target, a hub unit bearing which rotatably supports a wheel and a braking rotating body with respect to a suspension device for a vehicle. As shown in FIG. 5, a hub unit bearing 31 rotatably supports a hub 33 which is an inner diameter side track ring member and a rotation side track ring member inside an outer ring 32 which is an outer diameter side track ring member and a fixed side track ring member via a plurality of rolling elements 34a and 34b.

The outer ring 32 is made of a hard metal such as medium carbon steel and includes a double-row outer ring tracks 35a and 35b and a stationary flange 36. The double-row outer ring tracks 35a and 35b are formed on the inner circumferential surface of the axially intermediate portion of the outer ring 32 over the entire circumference. The stationary flange 36 is formed to protrude outward in a radial direction of the axial intermediate portion of the outer ring 32 and has support holes 37 which are screw holes at a plurality of places of the radially intermediate portion in a circumferential direction. The outer ring 32 is supported and fixed to the knuckle 38 by screwing bolts 40 configured to pass through through holes 39 formed in a knuckle 38 constituting the suspension device of the vehicle into the support holes 37 of the stationary flange 36 from the inside in the axial direction and further tightening the bolts 40.

Figure 6:
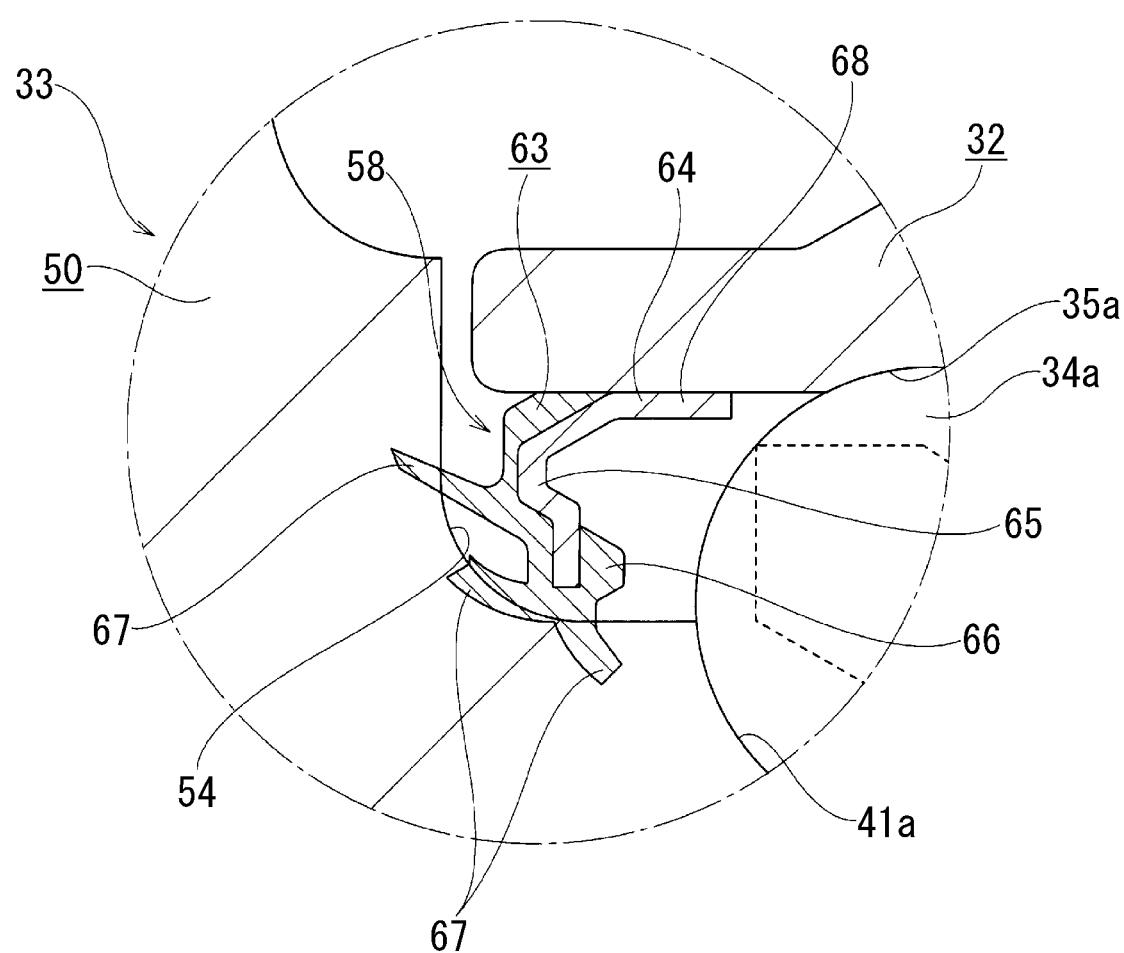
FIG. 6 is an enlarged view of part X of FIG. 5.

The inside of the hub unit bearing 31 in the axial direction is referred to as the right side of FIGS. 5 and 6 which is a center side of a vehicle body in a state in which the hub unit bearing 31 is assembled to an automobile. On the other hand, the outside thereof in the axial direction is referred to as the left side of FIGS. 5 and 6 which is an outer side of the vehicle body in a state in which the hub unit bearing 31 is assembled to an automobile.

Thu hub 33 is disposed coaxially with the outer ring 32 on the inner diameter side of the outer ring 32 and includes a double-row inner ring tracks 41a and 41b and a rotary flange 42. The double-row inner ring tracks 41a and 41b are formed on a portion of the outer circumferential surface of the hub 33 facing the double-row outer ring tracks 35a and 35b over the entire circumference. The rotary flange 42 is formed to protrude outward in the axial direction at a portion of the hub 33 located further outward in the axial direction than an axially outer end portion of the outer ring 32 and has attachment holes 43 configured to pass through the radially intermediate portion in the axial direction at a plurality of places of the radially intermediate portion in the circumferential direction. In this example, in order to join and fix a braking rotating body 44 such as a disc and a drum to the rotary flange 42, serration portions formed on portions near a base end of a stud 45 are press-fitted into the attachment holes 43 and an intermediate portion of the stud 45 is press-fitted into through holes 46 formed in the braking rotating body. Furthermore, in order to fix a wheel 47 constituting the wheel to the rotary flange 42, a nut 49 is screwed into a male threaded portion formed on a distal end portion of the stud 45 and further tightened in a state in which the male threaded portion has passed through a through hole 48 formed in the wheel 47. Since the hub unit bearing 31 in this example is for a drive wheel, an engagement hole 61 configured to engage with a drive shaft (not shown) exists at a central portion of the hub 33.

In this example, the hub 33 is constituted by joining and fixing a hub main body 50 made of a hard metal such as medium carbon steel and having an inner ring track 41a on the outer side in the axial direction and an inner ring 51 made of a hard metal such as bearing steel and having an inner ring track 41b on an inner side in the axial direction to each other. To be specific, when an axially inner end surface of the inner ring 51 is pressed using a staking portion 53 obtained by elastically deforming an axially inner end portion of a cylindrical portion 52 existing at an axial inner end portion of the hub main body 50 outward in the radial direction in a state in which the inner ring 51 is externally fitted to an axially inner portion of the hub main body 50, the hub main body 50 and the inner ring 51 are joined and fixed. The hub 33 in this example has a sliding contact surface 54 over the entire circumference within a range from the radially inner end portion of the axially inner surface of the rotary flange 42 to a portion of the outer circumferential surface existing further outward in the axial direction than the inner ring track 41a on the outer side in the axial direction. The sliding contact surface 54 has a large number of grinding lines formed in irregular directions and/or has an arithmetic average roughness Ra of 0.1 µm or less.

The rolling elements 34a and 34b are each made of a hard metal such as bearing steel or ceramics and a plurality of rolling elements 34a and 34b are rotatably disposed between the double-row outer ring tracks 35a and 35b and the double-row inner ring tracks 41a and 41b while being held using retainers 55a and 55b. With such a constitution, the hub 33 is rotatably supported on the inner diameter side of the outer ring 32. In this example, balls are used as the rolling elements 34a and 34b.

Also, in the hub unit bearing 31 in this example, an axially inner opening portion of an internal space 56 having the rolling elements 34a and 34b disposed therein is closed by means of a combination seal ring 57 and an axially outer opening portion of the internal space 56 is closed by means of a sealing device 58. Thus, the grease sealed in the internal space 56 is prevented from leaking to the outside and foreign matters such as rainwater, mud, and dust are prevented from entering the internal space 56.

The combination seal ring 57 is obtained by bring distal end portions of a plurality of seal lips constituting a seal ring 60 which is internally fitted and fixed to the axially inner end portion of the outer ring 32 into contact with a slinger 59 which is externally fitted and fixed to the axially inner end portion of the hub 33 in a slidable manner.

The sealing device 58 includes an annular core metal 62 and an elastic material 63 made of an elastomer or the like such as rubber reinforced using the core metal 62.

The core metal 62 has a substantially L-shaped cross sectional shape formed by bending and forming a metal sheet such as mild steel sheet and is constituted to have an annular shape as a whole. That is to say, the core metal 62 includes a fitting cylinder portion 64 which has a cylindrical shape and is internally fitted and fixed to the axially outer end portion of the outer ring 32 and a bent portion 65 which is bent inward in the radial direction from an axially outer end portion of the fitting cylinder portion 64.

The elastic material 63 includes a base portion 66 and a plurality of (three in the illustrated example) seal lips 67. The base portion 66 is fixed to the axially outer surface and the radially inner end portion of the bent portion 65 of the core metal 62 through vulcanization adhesion to cover the axially outer surface and the radially inner end portion. Each of the seal lips 67 extends from the base portion 66 toward the sliding contact surface 54 of the hub 33 and has a distal end portion in contact with the sliding contact surface 54 in a slidable manner over the entire circumference.

In this example, when the hub main body 50 constituting the hub 33 of the hub unit bearing 31 is produced, first, an exterior form of the hub main body 50 is formed by subjecting a material made of a metal to forging processing, cutting processing, or the like.

Figure 7:
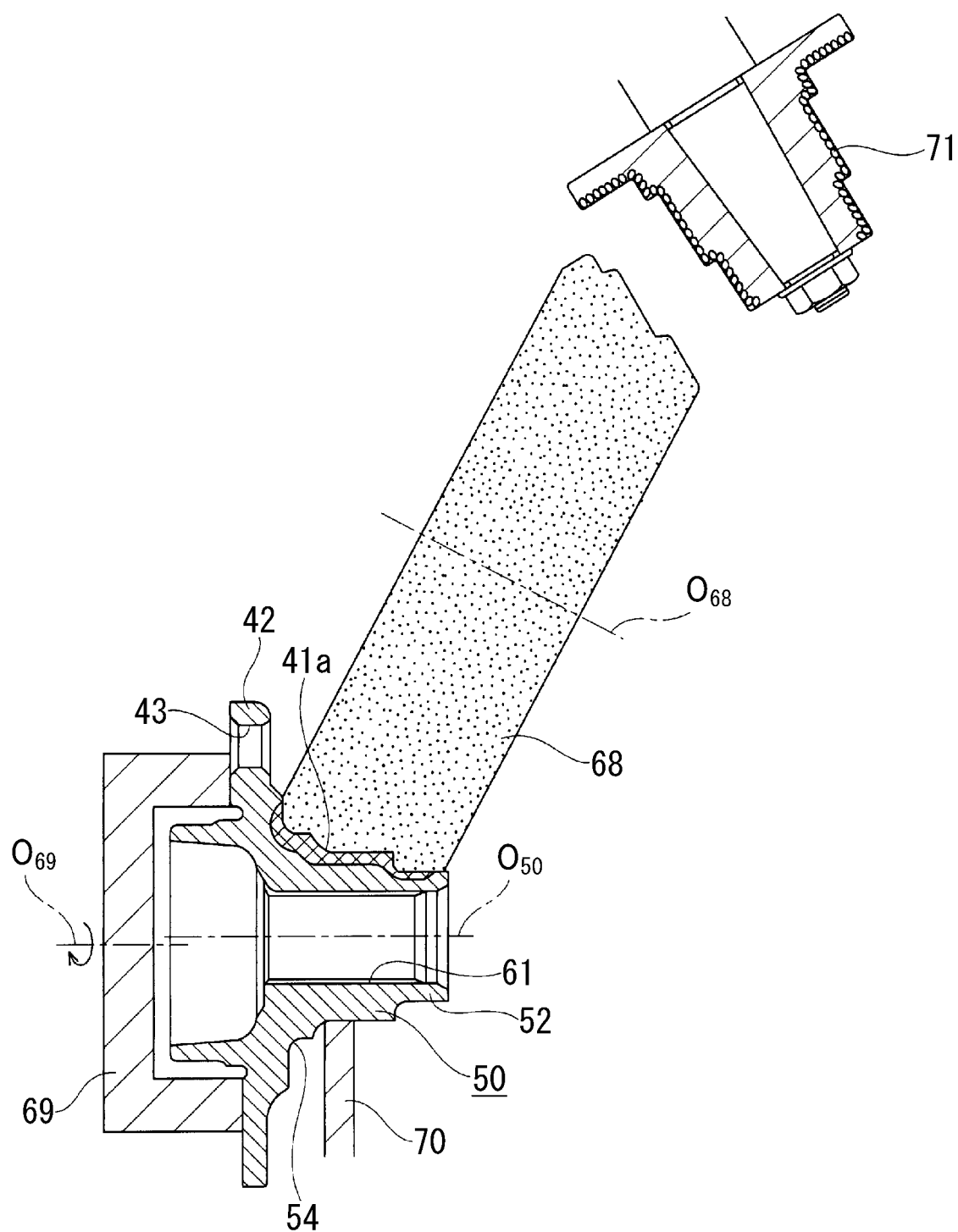
FIG. 7 is a side view showing a state in which a centerless grinding process is performed for the second example of the embodiment of the present invention.

In the subsequent centerless grinding process, as shown in FIG. 7, the outer circumferential surface of the hub main body 50 is subjected to grinding processing by pressing a grindstone 68 against a portion of an outer circumferential surface of the hub main body 50 including the sliding contact surface 54 while the hub main body 50 is rotated relative to a grindstone 68 in a prescribed direction.

The grindstone 68 in this example is a so-called general type rotary grindstone having a generatrix shape along a generatrix shape of the outer circumferential surface of the hub main body 50 in a range from the sliding contact surface 54 to the axially inner end portion of the cylindrical portion 52. The grindstone 68 is, for example, formed by bonding A (alumina)-based abrasive grains with a glass-based bond and can include grindstones having a bonding particle size of #60 to #400, a degree of bonding of G to O, a degree of concentration of 4 to 12, and a porosity of 20% to 50%.

When the centerless grinding process is performed using the grindstone 68, first, a magnetic chuck 69 is joined to the axially outer surface of the rotary flange 42 through magnetic attraction. When the magnetic chuck 69 is rotated, the hub main body 50 is rotated. Furthermore, the hub main body 50 is positioned in the radial direction by supporting the outer circumferential surface of the intermediate portion of the hub main body 50 in the axial direction using a pair of shoes 70 (only one is shown in FIG. 6). Moreover, when an outer circumferential surface of the grindstone 68 is pressed against a portion of the outer circumferential surface of the hub main body 50 including the sliding contact surface 54 while the grindstone 68 which is a general type rotary grindstone is rotated about a central axis $O_{68}$ of the grindstone 68 itself, the portion is subjected to grinding processing. A generatrix shape of the grindstone 68 is appropriately adjusted using a general type rotary dresser 71 to have a shape along the generatrix shape of the hub main body 50 which has been subjected to the centerless grinding process. Furthermore, deformation such as ridges and burrs is likely to occur on both sides of a portion of the sliding contact surface 54 of the hub main body 50 obtained using centerless grinding process through which the abrasive grains in the grindstone 68 has passed.

In the subsequent finishing step, the sliding contact surface 54 is subjected to a process for eliminating the directivity of the surface roughness generated on the sliding contact surface 54 using centerless grinding. For example, a large number of grinding lines in irregular directions are formed on the sliding contact surface 54 and/or a process for improving the surface roughness of the sliding contact surface 54 is performed.

Figure 8:
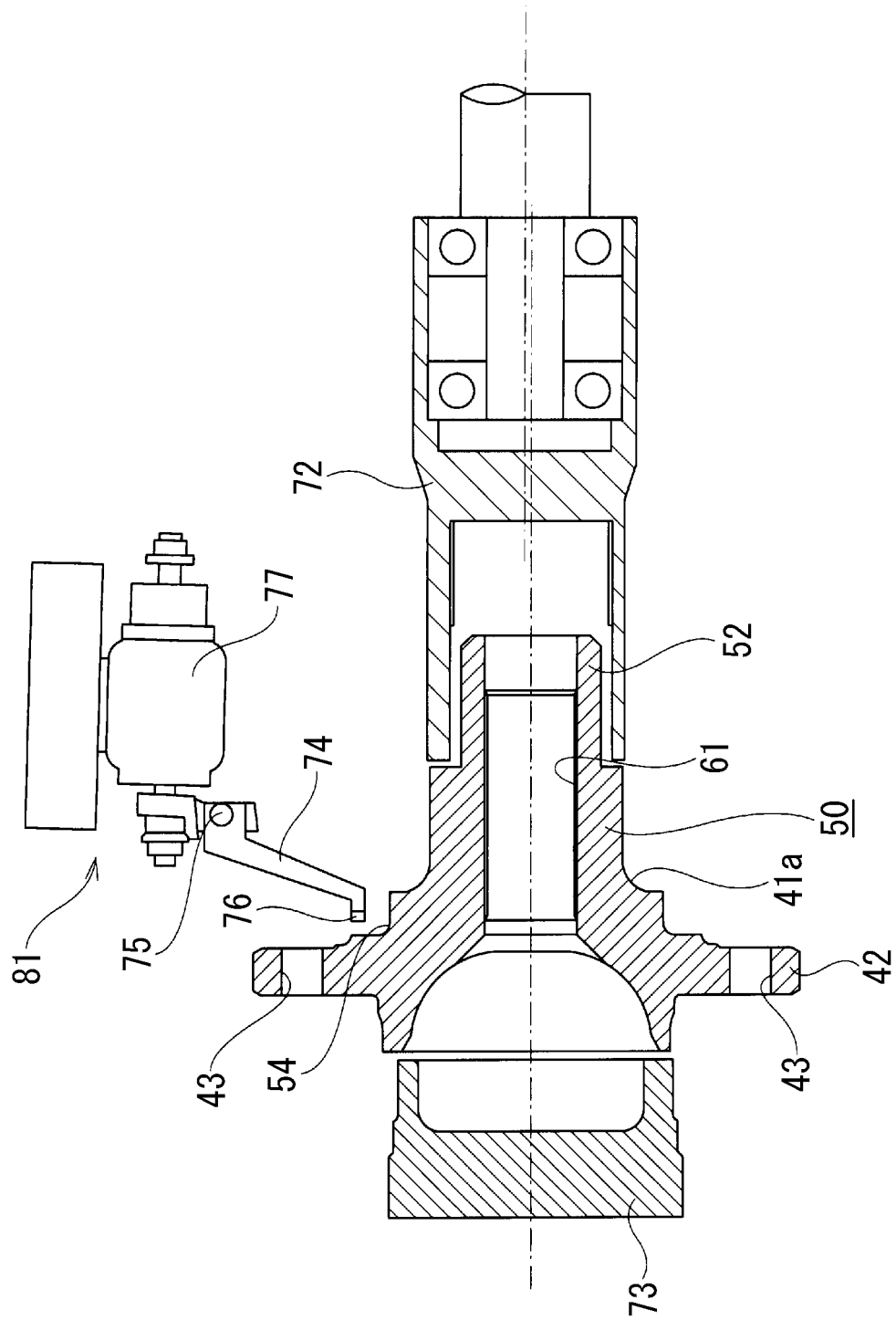
FIG. 8 is a cross-sectional view showing a state in which a finishing step is performed for the second example of the embodiment of the present invention.

For example, as shown in FIG. 8, in the finishing step, the sliding contact surface 54 of the hub main body 50 can be subjected to the super-finishing processing. When the super-finishing processing is performed, the hub main body 50 is rotated by pressing the hub main body 50 in the axial direction using a pressurizing roll 72, pressing the axially outer end portion of the hub main body 50 against a backing plate 73, and rotating the backing plate 73. Furthermore, a super-finishing grindstone 76 is pressed against the sliding contact surface 54 by displacing an arm 74 in the axial direction using a feed mechanism 77 while the super-finishing grindstone 76 supported on a distal end portion of the arm 74 is swaged (oscillated) by swaging the arm 74 of a super-finishing board 81 about a swing shaft 75 disposed at a twisted position with respect to a central axis of the hub main body 50. In this way, the surface roughness of the sliding contact surface 54 is improved by performing the super-finishing processing on the sliding contact surface 54 of the hub main body 50. That is to say, the unevenness due to the deformation such as the ridges and the burrs formed in the centerless grinding process is reduced.

Specific examples of the super-finishing grindstone 76 include super-finishing grindstones in which A (alumina)-based or GC (green silicon carbide)-based abrasive grains are bonded with a glass-based bond and which have a bonding particle size of #1000 to #8000 and Rockwell hardness H scale (RH) of −120 to 40.

Figure 9:
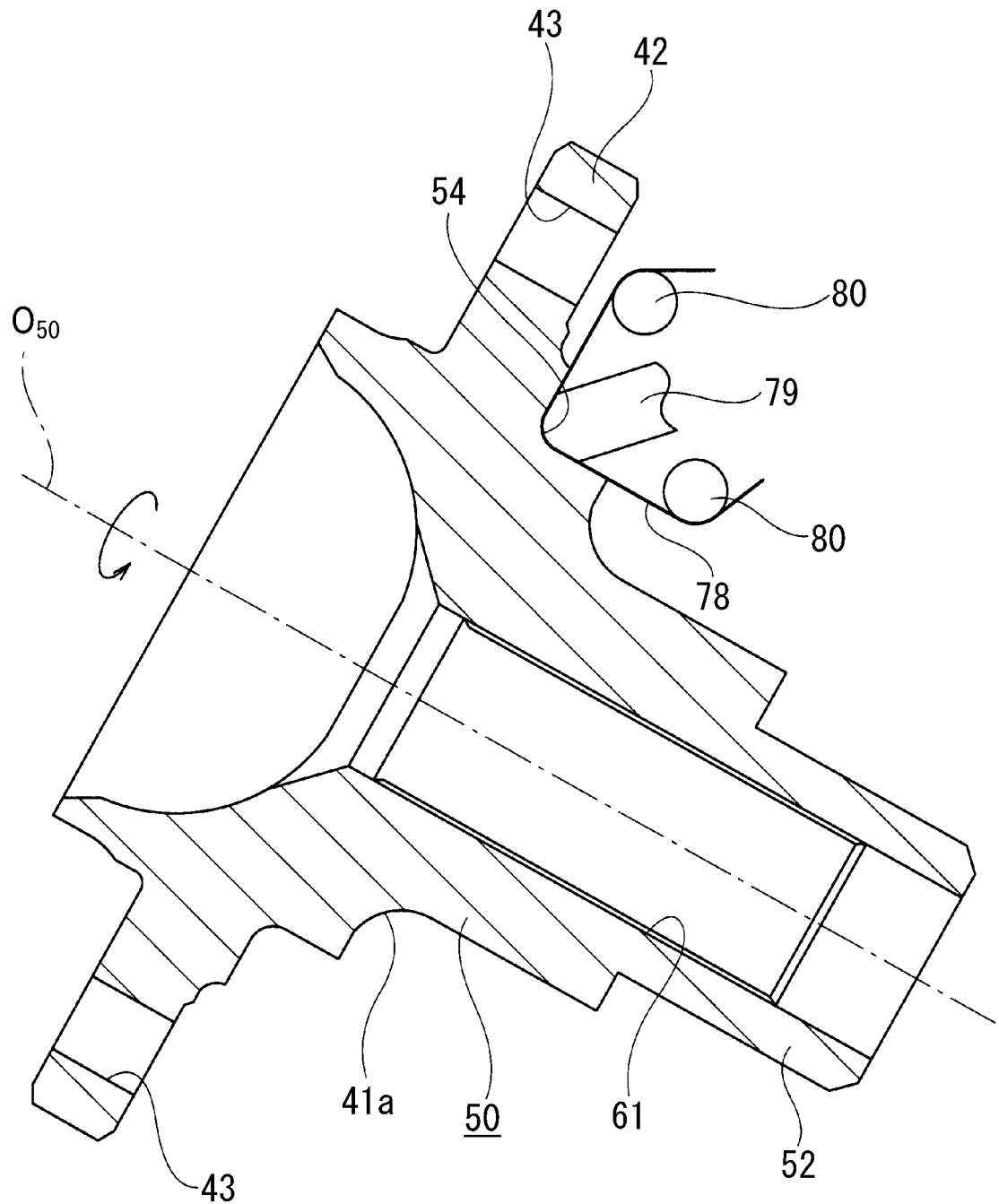
FIG. 9 is a cross-sectional view showing another example of the state in which the finishing step is performed for the second example of the embodiment of the present invention.

Alternatively, as shown in FIG. 9, the finishing step can also be performed using a polishing tape (a wrapping film) 78 having a surface coated with abrasive grains. The polishing tape 78 is formed by substantially uniformly applying abrasive grains such as white alumina, green carborundum, and diamond having a bonding particle size of #1000 to #8000 onto a surface of a polyester film having a thickness of 25 μm to 75 μm using an adhesive in a thickness range of 5 μm to 10 μm.

When the finishing step is performed using the polishing tape 78, the hub main body 50 is rotated about the central axis $O_{50}$ of the hub main body 50. Moreover, when the polishing tape 78 is fed from the outer side in the axial direction toward the inner side in the axial direction along the sliding contact surface 54 using a plurality of (only two rolls are shown in FIG. 9) rolls 80 while the polishing tape 78 is pressed against the sliding contact surface 54 using the head 79, the sliding contact surface 54 is subjected to tape polishing processing. This improves the surface roughness of the sliding contact surface 54. That is to say, the unevenness due to the ridges and the burrs formed in the centerless grinding process is reduced.

Here, the finishing step is not limited to super-finishing processing and tape polishing processing. Other processing methods in which a large number of grinding lines in irregular directions can be formed on the sliding contact surface 54 and/or the surface roughness of the sliding contact surface 54 can be improved can be adopted. To be specific, for example, the finishing step can be performed by grinding or polishing the sliding contact surface 54 using an elastic grindstone having appropriate elasticity, an abrasive grain-containing brush, or a non-woven fabric abrasive.

Also, before, after, or at the same time as the finishing step, the hub main body 50 is completed by subjecting the inner ring track 41a on the outer side in the axial direction to super-finishing processing and heat treatment such as quenching at an appropriate timing as necessary. Moreover, the hub unit bearing 31 is obtained by combining the hub main body 50 with the outer ring 32, the rolling elements 34a and 34b, the retainers 55a and 55b, the inner ring 51, the combination seal ring 57, and the sealing device 58. For example, a conventionally known method can be applied to a method for producing the outer ring 32, the rolling elements 34a and 34b, the retainers 55a and 55b, the inner ring 51, the combination seal ring 57, and the sealing device 58 and a method for assembling the hub unit bearing 31.

Since the centerless grinding process is performed and then the finishing step is performed in this example, a large number of grinding lines in irregular directions can be formed on the sliding contact surface 54 and/or the surface roughness of the sliding contact surface 54 can be improved. Therefore, according to this example, the difference in sliding torque of the distal end portion of the seal lip 67 with respect to the sliding contact surface 54 between the relative rotation of the hub 33 with respect to the outer ring 32 in the first direction and the relative rotation thereof in the second direction opposite to the first direction can be kept small. The composition and the action effect of other parts are the same as those of the first example of the embodiment.

Although the method for producing a hub unit bearing in this example has, as a target, the hub unit bearing 31 using balls as the rolling elements 34a and 34b, the method for producing a hub unit bearing of the present invention can also have, as a target, the hub unit bearing using the tapered roller as a rolling element. Furthermore, the method for producing a hub unit bearing of the present invention is not limited to the hub unit bearing for a drive wheel having engagement holes for engaging the drive shaft in the central portion of the hub and can also have, as a target, the hub unit bearing for a driven wheel whose hub is solid. Furthermore, the method for producing a hub unit bearing of the present invention is not limited to the inner ring rotation type hub unit bearing and also has, as a target, the outer ring rotation type hub unit bearing in which the outer diameter side track ring member is used as the rotation side track ring member and the inner diameter side track ring member is used as the fixed side track ring member as long as the hub unit bearing includes a sealing device.

Figure 10:
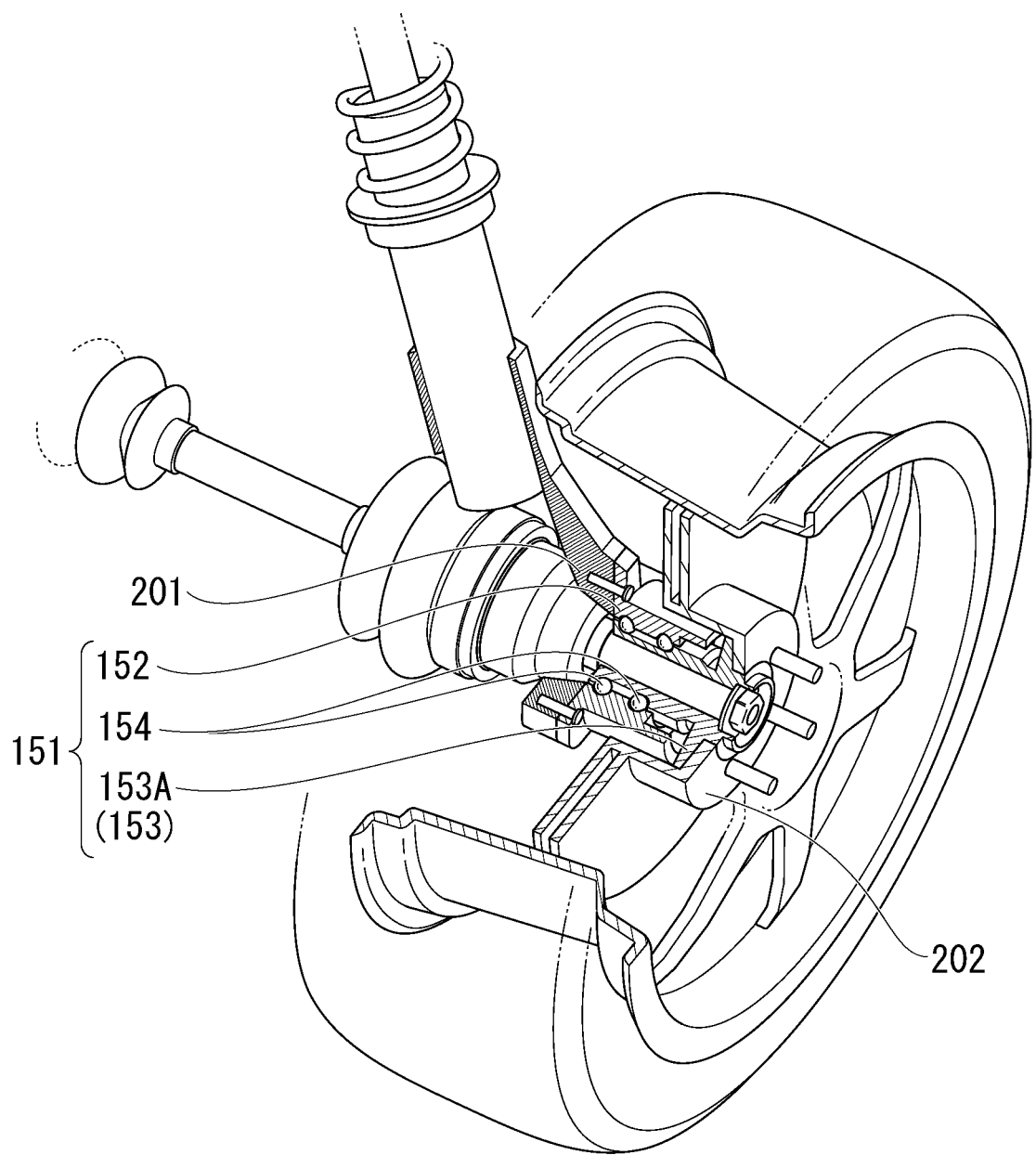
FIG. 10 is a partial schematic view of a vehicle including a hub unit bearing (a bearing unit).

FIG. 10 is a partial schematic view of a vehicle 200 including a hub unit bearing (a bearing unit) 151. The present invention can be applied to both of the hub unit bearing for a drive wheel and the hub unit bearing for driven wheel. In FIG. 10, the hub unit bearing 151 is for a drive wheel and includes an outer ring 152, a hub 153, and a plurality of rolling elements 156. The outer ring 152 is fixed to a knuckle 201 for a suspension device using bolts or the like. A wheel (and a braking rotating body) 202 is fixed to a flange (a rotary flange) 153A provided on the hub 153 using bolts or the like. Furthermore, the vehicle 200 can have a support structure as in the above description to the hub unit bearing 151 for a driven wheel.

REFERENCE SIGNS LIST

1 Rolling bearing
2 Outer ring
3 Inner ring
4 Rolling element
5 Sealing device
6 Outer ring track
7 Locking concave groove
8 Inner ring track
9 Seal groove
10 Sliding contact surface
11 Retainer
12 Internal space
13 Core metal
14 Elastic material
15 Cylindrical portion
16 Annular portion
17 Elastic locking portion 18 Circular ring covering portion
19 Seal portion
20 Seal lip
21 Grease lip
22 Dust lip
23 Grindstone
24 Grinding machine
25 Adjustment wheel
26 Work rest
27 Grinding fluid nozzle
28 Cleaning device
29 Elastic grindstone
30 Abrasive grain-containing brush
31 Hub unit bearing
32 Outer ring
33 Hub
34a, 34b Rolling element
35a, 35b Outer ring track
36 Stationary flange
37 Support hole
38 Knuckle
39 Through hole
40 Bolt
41a, 41b Inner ring track
42 Rotary flange
43 Attachment hole
44 Braking rotating body
45 Stud
46 Through hole
47 Wheel
48 Through hole
49 Nut
50 Hub main body
51 Inner ring
52 Cylindrical portion
53 Staking portion
54 Sliding contact surface
55a, 55b Retainer
56 Internal space
57 Combination seal ring
58 Sealing device
59 Slinger
60 Seal ring
61 Engagement hole
62 Core metal
63 Elastic material
64 Fitting cylinder portion
65 Bent portion
66 Base portion
67 Seal lip
68 Grindstone
69 Magnet chuck
70 Shoes
71 Rotary dresser
72 Pressurizing roll
73 Backing plate
74 Arm
75 Swing shaft
76 Super-finishing grindstone
77 Feed mechanism
78 Polishing tape
79 Head
80 Roll
81 Super-finishing board

What is claimed is:

1. A method for producing a track ring member having a sliding contact surface with which a distal end portion of a seal lip is in contact in a slidable manner over an entire circumference, the method comprising:
performing a centerless grinding so that the sliding contact surface is subjected to grinding by pressing a grindstone against the sliding contact surface while rotating the track ring member relative to the grindstone in a prescribed direction; and
performing a finishing process, after the performance of the centerless grinding, by subjecting the sliding contact surface of the track ring member to a process of eliminating directivity of surface roughness, which is generated on the sliding contact surface by grains used in the centerless grinding,
wherein the finishing process comprises forming grinding lines in irregular directions on an area including the sliding contact surface of the track ring member by using an abrasive grain containing brush, a non-woven fabric abrasive, or a polishing tape so that an uneven shape of the sliding contact surface, which has the directivity of surface roughness, becomes complicated.

2. A method for producing a rolling bearing which includes:
a first track ring member;
a second track ring member having a surface having a sliding contact surface over the entire circumference and disposed coaxially with the first track ring member;
a plurality of rolling elements rotatably disposed between the first track ring member and the second track ring member; and
a sealing device having at least one seal lip having a distal end portion in contact with the sliding contact surface in a slidable manner,
wherein the method for producing the rolling bearing comprises:
producing the first track ring member;
producing the second track ring member using the method for producing a track ring member according to claim 1; and
assembling the rolling bearing using the first track ring member, the second track ring member, the plurality of rolling elements and the sealing device.

3. The method according to claim 2, wherein one of the first track ring member and the second track ring member is an outer ring, and
the other of the first track ring member and the second track ring member is an inner ring coaxially disposed with the outer ring on an inner diameter side of the outer ring.

4. A method for producing a hub unit bearing using centerless grinding in which the hub unit bearing has an outer ring, a hub, a plurality of rolling elements, a seal lip, and a sliding contact surface which is provided on the outer ring or the hub and with which a distal end of the seal lip is in contact in a slidable manner, the method comprising:
performing a centerless grinding so that the sliding contact surface is subjected to grinding by pressing a grindstone against the sliding contact surface while rotating the outer ring or the hub relative to the grindstone in a prescribed direction;
performing a finishing process, after the performance of the centerless grinding, by subjecting the sliding contact surface of the outer ring or the hub to a process of eliminating directivity of surface roughness, which is generated on the sliding contact surface by grains used in the centerless grinding; and
assembling the hub unit bearing using the outer ring, the hub, the plurality of rolling elements, and the seal lip, wherein the finishing process comprises forming grinding lines in irregular directions on an area including the sliding contact surface by using an abrasive grain-containing brush, a non-woven fabric abrasive, or a polishing tape so that an uneven shape of the sliding contact surface, which has directivity or surface roughness, becomes complicated.

5. A method for producing a hub unit bearing which includes:

an outer diameter side track ring member having a double-row outer ring track on an inner circumferential surface;

an inner diameter side track ring member having a surface having a sliding contact surface over the entire circumference and having a double-row inner ring track on an outer circumferential surface;

a plurality of rolling elements rotatably disposed between the double-row outer ring track and the double-row inner ring track; and a sealing device having at least one seal lip having a distal end portion in contact with the sliding contact surface in a slidable manner, in which one of the outer diameter side track ring member and the inner diameter side track ring member is a fixed side track ring member supported and fixed to a suspension device, and the other of the outer diameter side track ring member and the inner diameter side track ring member is a rotation side track ring member which rotates together with a wheel, wherein the method for producing the hub unit bearing comprises:

producing the outer diameter side track ring member;

producing the inner diameter side track ring member using the method for producing a track ring member according to claim 3; and assembling the hub unit bearing using the outer diameter side track ring member, the inner diameter side track ring member, the plurality of rolling elements and the sealing device.

6. A method for producing a vehicle including a hub unit bearing, the method comprising:

producing the hub unit bearing using the method according to claim 5; and assembling the vehicle using the hub unit bearing.

7. The method according to claim 1, wherein the directivity of surface roughness is based on a relative moving direction of the sliding contact surface with respect to the grindstone in the centerless grinding.

8. The method according to claim 1, wherein the finishing process further comprises processing the sliding contact surface to improve surface roughness of the sliding contact surface.

9. The method according to claim 1, wherein the track ring member is a track ring member of a rolling bearing, or a track ring member of a hub unit bearing.

10. A method for producing a vehicle including a rolling bearing, the method comprising:

producing the rolling bearing using the method according to claim 2; and assembling the vehicle using the rolling bearing.

11. A method for producing a vehicle including a hub unit bearing, the method comprising:

producing the hub unit bearing using the method according to claim 4; and assembling the vehicle using the hub unit bearing.

* * * * *